United States Patent
Anderson

(10) Patent No.: US 9,426,230 B2
(45) Date of Patent: Aug. 23, 2016

(54) SYSTEM AND METHOD FOR ANTICIPATORY DOWNLOADING OF DATA

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 1226 days.

(21) Appl. No.: 11/222,301

(22) Filed: Sep. 8, 2005

(65) Prior Publication Data

US 2007/0055660 A1    Mar. 8, 2007

(51) Int. Cl.
    G06F 17/30   (2006.01)
    H04L 29/08   (2006.01)

(52) U.S. Cl.
    CPC ............ *H04L 67/18* (2013.01); *G06F 17/3087* (2013.01); *G06F 17/30241* (2013.01); *H04L 67/06* (2013.01); *H04L 67/322* (2013.01); *H04L 67/325* (2013.01)

(58) Field of Classification Search
    CPC ...... H04B 1/3822; H04L 67/02; H04L 67/04; H04L 67/06; H04W 4/18; G06F 17/30241; G06F 17/3087
    See application file for complete search history.

(56) References Cited

U.S. PATENT DOCUMENTS

| | | | |
|---|---|---|---|
| 6,181,994 B1 * | 1/2001 | Colson et al. | 701/33 |
| 6,338,046 B1 * | 1/2002 | Saari et al. | 705/34 |
| 6,401,034 B1 * | 6/2002 | Kaplan et al. | 701/416 |
| 6,456,931 B1 * | 9/2002 | Polidi et al. | 701/208 |
| 6,574,551 B1 * | 6/2003 | Maxwell et al. | 701/209 |
| 6,584,498 B2 * | 6/2003 | Nguyen | 709/219 |
| 2002/0143896 A1 * | 10/2002 | Hansmann et al. | 709/218 |
| 2003/0171094 A1 * | 9/2003 | Kawai | 455/3.01 |
| 2003/0204603 A1 * | 10/2003 | Buchanan et al. | 709/228 |
| 2006/0149463 A1 * | 7/2006 | Machii et al. | 701/209 |

FOREIGN PATENT DOCUMENTS

| | | | |
|---|---|---|---|
| GB | 2358765 | * | 8/2001 |
| WO | WO 96/41284 | | 12/1996 |

\* cited by examiner

*Primary Examiner* — Dinku Gebresenbet
(74) *Attorney, Agent, or Firm* — Yee & Associates, P.C.

(57) ABSTRACT

A system and method for intelligent computer-implemented downloading of up-to-date information at times when access to data connections are available to improve user efficiency. The system assesses data relevance, calculates the amount of time available for data connections, and prioritizes data downloads based on information relevance, file sizes, download times and other parameters to determine what information to download while access to a connection is available so that the information can be used at a later time when access to a connection may not be available.

13 Claims, 5 Drawing Sheets

SYSTEM AND METHOD FOR ANTICIPATORY DOWNLOADING OF DATA

FIELD OF THE INVENTION

The present invention relates to a system and method for intelligent computer-implemented downloading of up-to-date information at a time when access to appropriate connections to download the data is available, the system calculating the amount of time available, prioritizing the information that might be needed, file sizes and download times and other parameters to determine what information to download while access to a connection is available so that the information can be used at a later time when access to a connection may not be available.

BACKGROUND OF THE INVENTION

As more and more data becomes available in electronic form, accessing such data electronically is becoming more and more popular. This is particularly true for data that is subject to change, only needs to be used and viewed for a particular situation, or if a user does not want to carry paper or pre-recorded data storage mechanisms (i.e. CDs, DVDs, etc.). Additionally, if data is provided by a fixed-storage means, such as paper or CDs, updates must be sent out periodically, necessitating that distribution information be maintained for each user, physical copies of the paper/CDs be created, and the physical copies be sent to each user. This system is inefficient and not well-suited to situations where data is subject to change or new data will be added to the information source on a frequent basis.

It is desirable to provide users access to electronic information on-demand, from a central source in many cases. This enables document developers to make changes to data in a single location, which can then be accessed by users as needed from that location, thus ensuring that a user can always obtain the latest information. Additionally, it eliminates the need for a user to have to keep data stored on a computer hard drive or keep CDs or DVDs containing information accessible and updated so they have the latest version.

While keeping a single copy of data in a central location that can be accessed by users as needed works well when users can easily and quickly access that data, easy access is not always available. This is particularly true where the user base is geographically scattered, and/or accessing data from various field locations in which high-speed connections to the data source may not be available. This is often seen with field service technicians for various equipment that may be located in a building, or outside, or various other remote areas, and high-speed connections to the data source are not available. Typically, these types of persons need the latest version of data in order to perform a task properly, and thus pre-recorded data storage mechanisms are not well-suited for these uses. It may not be desirable to make such information available on the world-wide web for various reasons, such as corporate security, and thus this would not be a solution either; additionally, access to the internet might not be easily available from various field or remote locations.

SUMMARY OF THE INVENTION

Therefore, what is needed is a method and system for anticipating what information might be needed by a person in order to perform an upcoming task, and downloading the information to the person's computer in advance of when it will be needed when access to the data is available. While dynamic downloading/preloading. of web pages is known., such as that disclosed in U.S. Pat. No. 6,584,498, wherein when a web page is displayed on a user's screen, links on the displayed page that point to a second page are identified, and the second page is preloaded for later presentation, such systems only work with internet web pages where links to second pages are specified on the displayed web page.

The present system, in contrast, works to anticipate what data might be needed, based on the task to be performed and the person who will be performing the task, determining the location of the various pieces of data, calculating when the person may have access to a connection that would enable rapid downloading of the data, and based on these and other factors, such as what data could be downloaded in an available connection window, prioritizing what information should be downloaded, downloading the information while the person has access of the appropriate rate of speed for the data to be downloaded, and downloading the selected data to the user's computer system or a storage mechanism in advance of when it is needed by the user.

The present invention, accordingly, provides a system and method that is capable of anticipating that a computer user will need data about a particular device or system that is stored on a central or distributed storage means, and determining that the user's computer will not be in a location that will enable a suitable method of accessing the data when the user will need the data, or that a large amount of data may be needed that should be downloaded in anticipation of when it will be needed. The present invention, having made such a determination, is further capable of collecting and analyzing information about the data that is available that might be needed, determining if/when the user will have access to suitable data connections between the present time and the time when the data will be needed, analyzing information about the user to determine what data the specific user is most likely to utilize, and prioritizing what data to download and when to download that data so that the user has the information available when needed, even if an appropriate data connection is not available at the actual use location. It should be noted that data can be one or more of a variety of types of information, such as text files, audio files, pictures, video files, drawing files, or composite files that compose more than one element.

The system is also capable of further analysis, such as determining if lower-speed connections may be available at some times, and if so, if such a connection would be suitable for downloading one or more of the data files identified, and further prioritizing the download schedule to download those files during the time when the lower-speed connection is available, utilizing the higher bandwidth connections for data files that would not be well-adapted to being downloaded on the lower-speed connections. The system can even perform calculations to determine the costs associated with utilizing various data connections available for downloading during the available time period, and assessing the cost to download the information in light of the likelihood that information will be needed to further refine the list of files to download.

Thus, the present invention will help ensure that a computer user will have the data needed, regardless of where the data will be used by anticipating what data the user will need, and downloading that data, or a portion of the data prior to when it will be needed during time periods when the user's computer has access to one or more appropriate connections to the data. This invention will help streamline work and improve work efficiency by downloading the data the user is most likely to need to perform a task to the user's computer prior to the user actually needing it. By anticipating what the user will need, when and for how long the computer will have access to the data sources, calculating what data it can download in the time available, and downloading the data files that can be downloaded in the time available, the present invention can improve productivity.

It can be appreciated that various arrangements of the present invention would be useful in different environments or with different equipment or users. The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
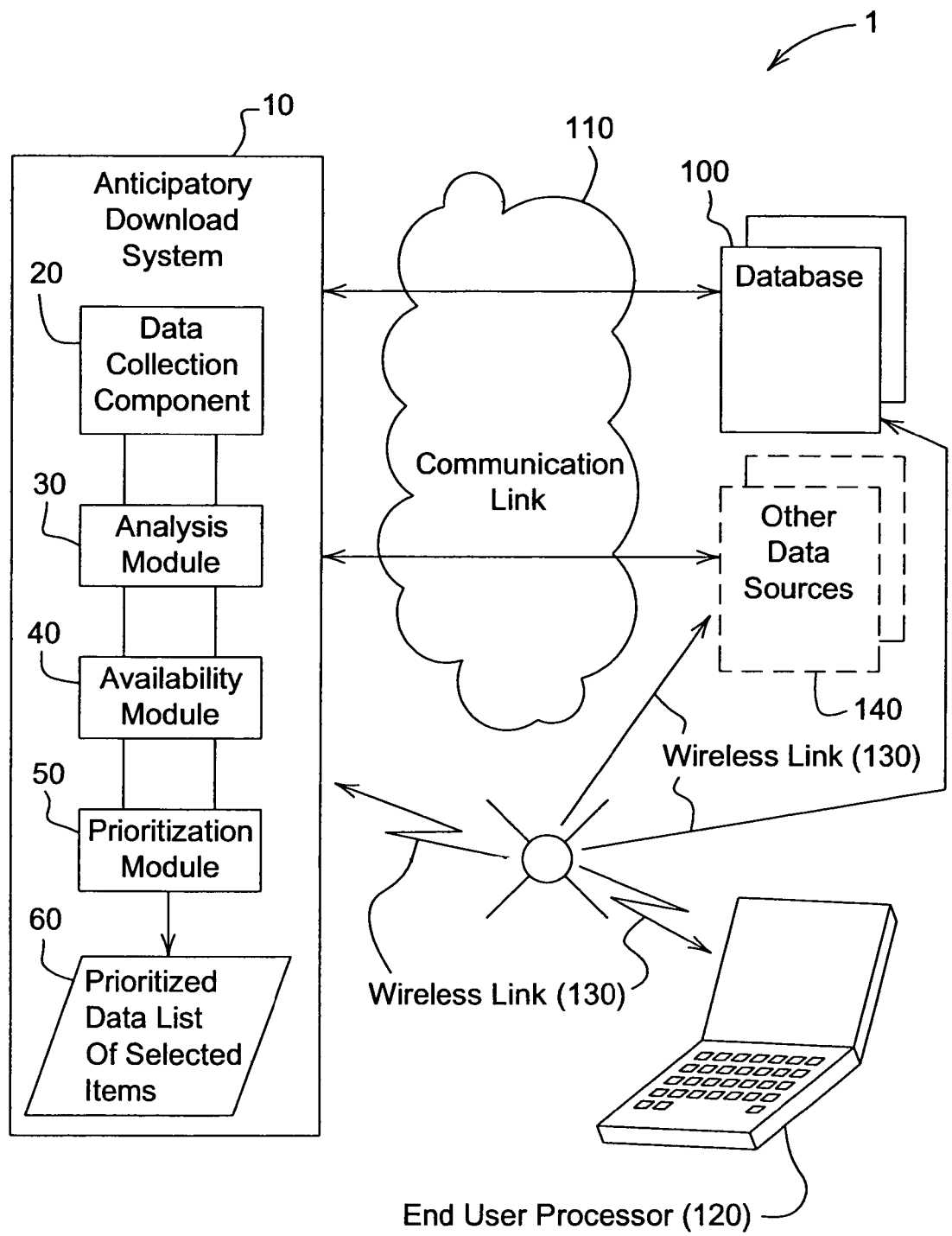
FIG. 1 is a block diagram of a system for anticipatory downloading of data of the present invention.

In the discussion of the FIGURES the same reference numerals will be used throughout to refer to the same or similar components. In the interest of conciseness, various other components known to the art, such as computer processing and storage mechanisms and the like necessary for the operation of the invention, have not been shown or discussed, or are shown in block form.

In the following, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning computer and database operation and the like have been omitted inasmuch as such details are not considered necessary to obtain a complete understanding of the present invention, and are considered to be within the knowledge of persons of ordinary skill in the relevant art.

Refer now to the drawings wherein depicted elements are, for the sake of clarity, not necessarily shown to scale and wherein like or similar elements are designated by the same reference numeral through the several views.

FIG. 1 shows a system of the present invention for performing computer-implemented anticipatory downloading of data. The system 1 includes an anticipatory downloading system 10, one or more databases 100 connected to the anticipatory downloading system 10 by means of one or more communication links 110, and an end-user processor 120, capable of being connected to the anticipatory downloading system 10 by means of at least one wireless communication link 130. Other data sources 140 may also be connected to the anticipatory downloading system 10 by means of one or more communication links 110. The anticipatory downloading system 10 is typically located on or connected to a central data server (not shown), along with various other data processing systems, but can be located in a variety of other locations, including on an end-user processor 120.

The anticipatory downloading system 10 comprises a data collection component 20, which collects data from the various external systems, including various databases 100 and other data sources 140. The anticipatory downloading system 10 also comprises an analysis module 30 that uses one or more computerized algorithms to rank the various data files collected by the data collection component 20 and their relevance to the event for which data downloads may be needed, in some cases taking other information that was collected about the event and/or user into consideration. The anticipatory downloading system 10 also comprises an availability module 40 that uses one or more computerized algorithms to determine what data connections are available and when and where they are available between the current time and the time the data will be needed. The availability module 40 can also collect other information about the data connections, such as costs, if appropriate. A prioritization module 50 collects the results from the analysis module 30 and availability module 40, and uses one or more computerized algorithms to prioritize what data should be downloaded and when, taking into consideration various factors like access time blocks, data file sizes and types, likelihood of use of the data, connection speeds and costs, etc. The system 10 may look at what data is already available on the person's computer, and if it is the latest version, re-prioritize what data should be downloaded, removing from the list of data to be downloaded those files already available on the person's computer in the latest version. The system 10 then generates a prioritized data download list 60 that tells the end user's processor 120 what files to download, when, and in what order.

Figure 2:
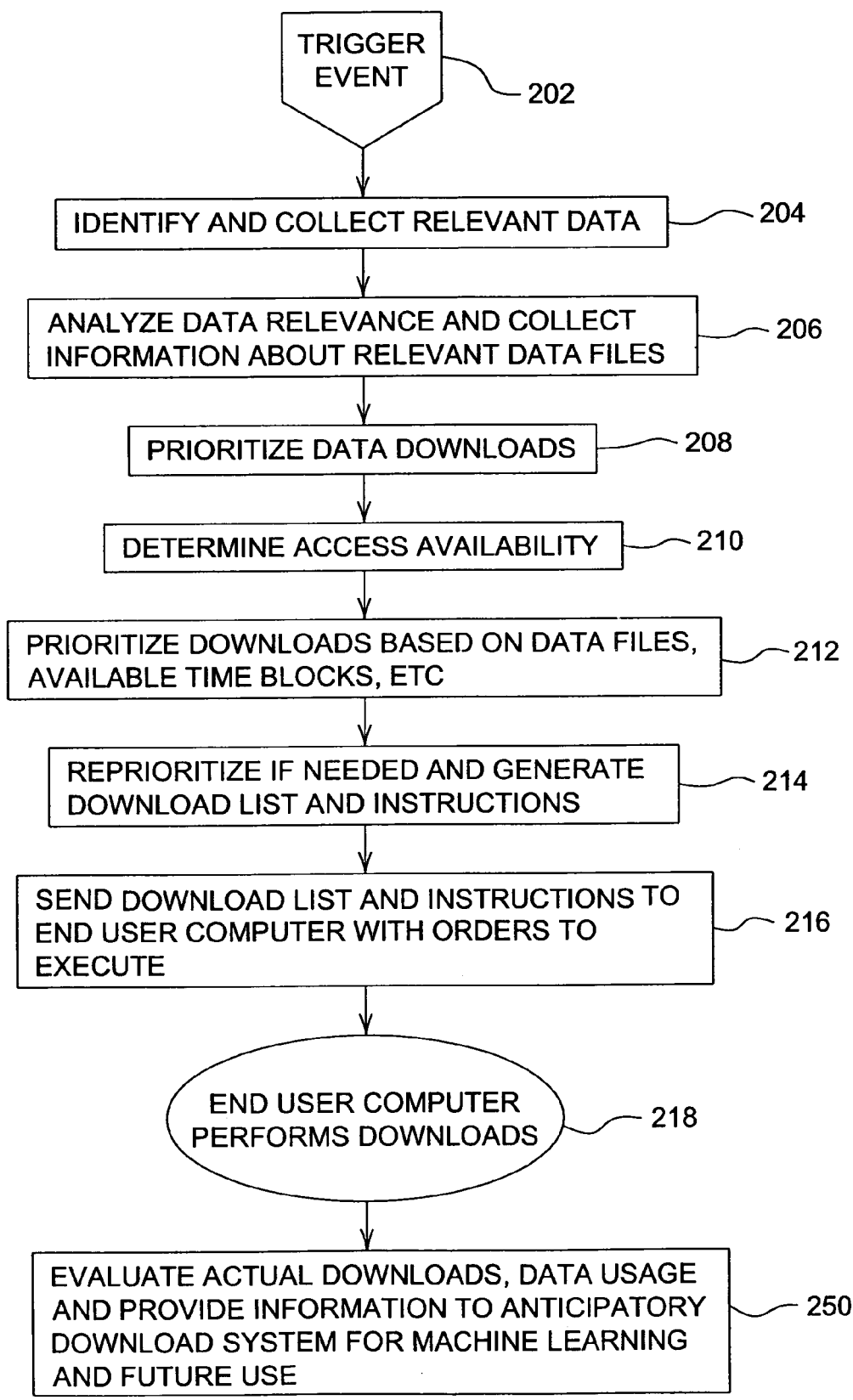
FIG. 2 is one embodiment of a method of anticipatory downloading of data of the present invention.

FIG. 2 shows a method of anticipatory downloading of data as in the present invention. The anticipatory download system 10 of the present invention is implemented by means of a trigger event, such as that shown in step 202 of FIG. 2. The trigger event 202 can be a variety of events, depending on the use of the anticipatory download system 10, but could include such things as a service call or a user-initiated request for information download on a particular topic. This trigger event 202 prompts the data collection component 20 to identify and collect information about data from various external systems at step 204. It can be appreciated that how the system identifies data can be achieved in a variety of ways. Typically, files will be indexed by key words, or context indexers to indicates topic(s) to which they are related. However, other systems, such as linear text or audio file scanning or various other methods can also be used. The database sources and information collected will vary based upon the use to which the anticipatory downloading system 10 is put, and can be configured when the system 10 is being installed initially, or can be done or modified later.

At step 206, the analysis module 30 will use one or more computerized algorithm(s) to examine the various data files collected in step 204, and assess the relevance of the identified data to the event for which data downloads may be needed. Other information about the files, such as the file size and type may also be identified. At step 208, the analysis module 30 will assign priorities to the various data files that are relevant and are candidates to be pre-downloaded.

At step 210 the availability module 40 will use computerized algorithm(s) to determine when and where high-speed data connections will be available between the current time and the time when the data will be needed by the end user, and if appropriate, the costs associated with the various connections. If the end user will be traveling to a different location, the route and various data connections that could be available on the route will be assessed as part of the calculations.

At step 212 the prioritization module 50 will collect the results obtained from the algorithms performed in steps 208 and 210 and use one or more computerized algorithms to prioritize what data should be downloaded and when, taking into consideration the various factors and information collected by the analysis and availability modules 30, 40, such as priority and accessibility. The prioritization module 50 may even take costs for the various connections into consideration when doing the calculations. For example, if a particular file can only be downloaded over a particular type of connection, which while it is available, is expensive, and the file has been assigned a very low priority, the system 10 may conclude that it is not worth the cost to download that particular file based on the low likelihood that the file will actually be used. The system 10 also looks at when a particular piece of data may be needed. For example, data needed at the end of a process could be downloaded at the site while earlier steps in a process are being performed, depending on data file type, size, and connection available at the site, whereas the data about initial steps in a process should be downloaded before the end user gets to the site, if possible, to improve efficiency and reduce wait time.

At step 214, the prioritization module 50 will generate a prioritized download list and instructions based on how much data can be downloaded in the available time blocks, reprioritizing and/or rearranging the previous list generated at step 208 as necessary, that indicates what blocks of data should be downloaded when various data connections are available. This download list will be sent to the end user's processor 120 at step 216 and will tell it what data files to download, in what order, and when, even providing information about the data connections and when, where, and how to access them. Additionally, if the cache of data items already stored on the end user's computer is so large that it will prevent downloading of all the new items needed, the end user's processor 120 will delete items already stored in the computer, beginning with those items having the Least Recently Used (LRU) stamp with the oldest date of last use, and moving up through newer files until sufficient files have been deleted to provide enough storage space for the new files to be downloaded.

The end user's computer will perform the specified downloads in order during the available access times at step 218, providing the end user with access to information s/he is projected to need to perform tasks. In some situations, although there may be no better access to the information than will be available at the site prior to arriving at the site, the system 10 might still engage in anticipatory downloading, based on likelihood that data will be used, and time it may take to download so the end user will not have to wait for information to download at the site before activities can be commenced.

The system 10 of the present invention is capable of intelligent machine learning, and will collect data to improve future performance of the system. After the end user has completed the task(s) for which the information was used, the anticipatory downloading system 10 will, at step 250, evaluate what data the end user actually used in performing the task, the order in which it was used, and if additional information was needed that had not been anticipated to be needed by the system. The system will also look at actual data download time vs. the projected data download time for that data with a particular type of data connection. The anticipatory downloading system 10 will use this information to assist it in providing more accurate future relevance rankings and prioritization for data files, equipment and end users. The capability of the anticipatory downloading system 10 for machine learning will help the system more accurately identify and assess data files and determine what files to download in future situations, as the base of knowledge and experience grows with time.

One use for the present invention is for field service personnel, who are often called out to fix a broken piece of equipment in situ. The location of the equipment can vary, based on the type of equipment, and where it is located when it needs service. When the equipment is located in a repair shop or urban environment, the service person may have ready access to a connection to the knowledge databases, and thus there may be less need for the present invention, although it can be appreciated that anticipatory downloading of the repair information could still be useful in these situations as well. There is a greater need for the present invention when the equipment to be serviced is located in a remote geographic area, or other environments where access to the databases cannot be easily made, or cannot be made at a speed that will allow for downloading of the needed information in a suitably prompt manner.

It can also be appreciated that there are additional applications for the present invention in addition to field service uses, such as factory floor or other applications, or attending or making a presentation at a location remote from the main databases and where access will not be available to the main databases, but information contained therein may be needed while at the remote site.

Figure 3:
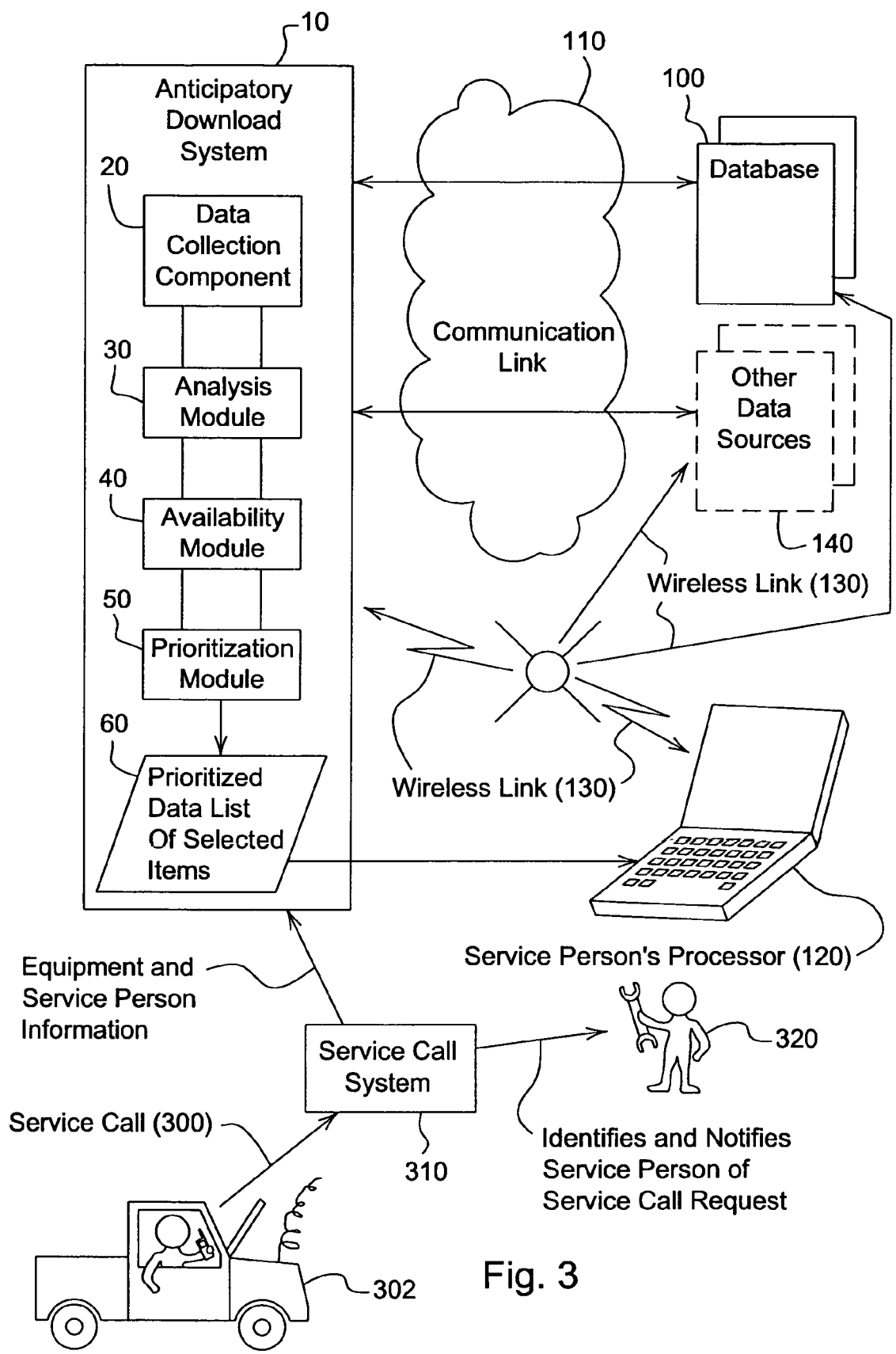
FIG. 3 is a block diagram of an exemplary system for anticipatory downloading of data of the present invention.
Figure 4:
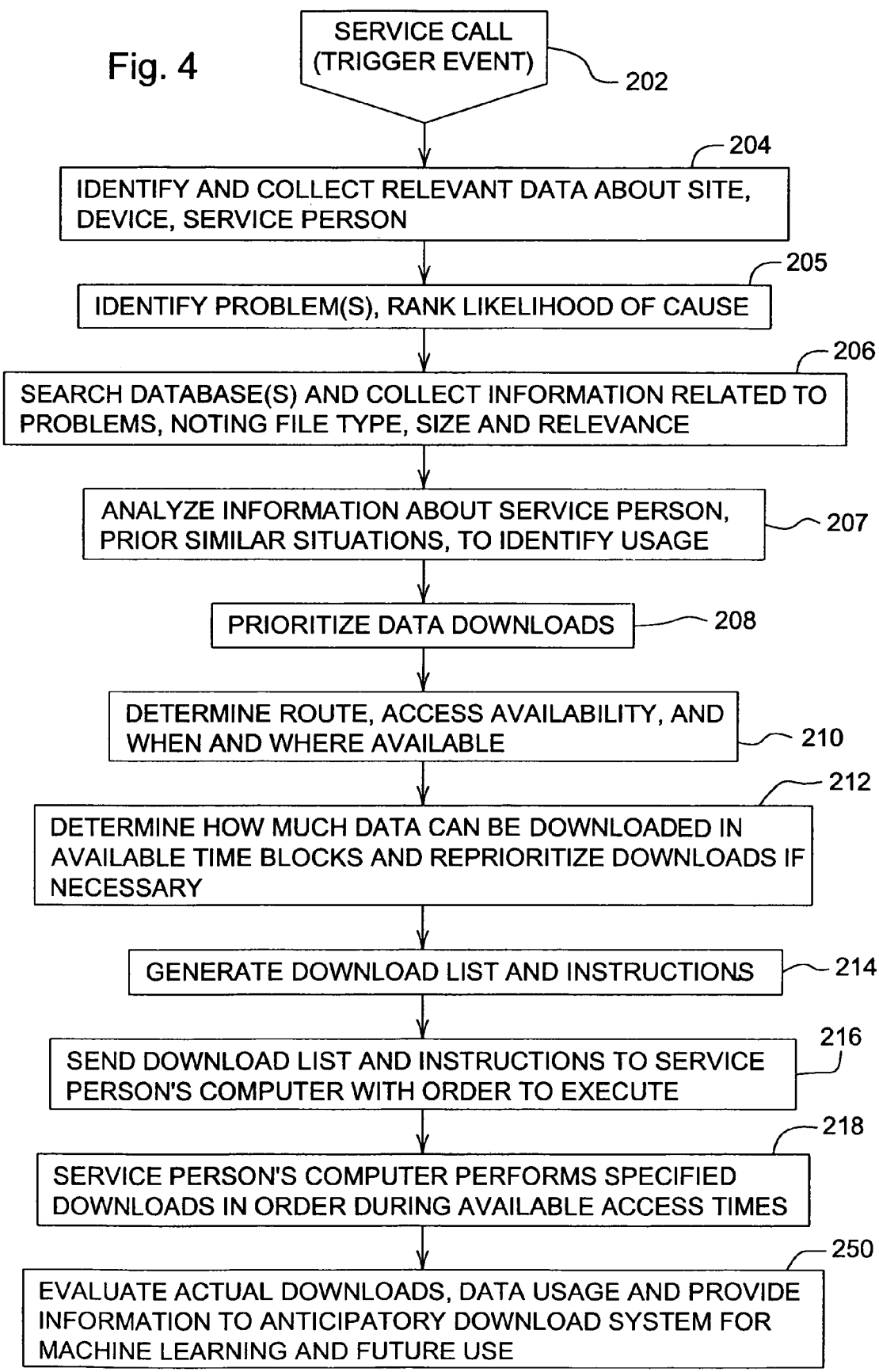
FIG. 4 is a schematic representation of an exemplary system utilizing anticipatory downloading of data as in the present invention.

A specific example of one embodiment of the present invention is disclosed in FIGS. 3 and 4. This example is directed to an instance in which a service call 300 is made to repair a piece of equipment 302 that has failed in a remote geographic area. This service call 300 may be initiated by a person, or in some situations, the equipment 302 is equipped with a system that can initiate a request for service. Service calls 300 are made to a service call system 310, which may reside on the same computer system (not shown) as the anticipatory download system 10, or may be on a different system that is connected to or can communicate with the anticipatory download system 10. Information about the failure is collected and entered into the service call system 310. The information may be collected manually, from a person initiating a service call, or in some instances, the service call system 310 can communicate with the equipment 302 to collect and identify failure codes or other information that help identify the causes or potential causes of the equipment failure.

Once a service call 300 has been placed and entered into the service call system 310, a service person 320 is assigned to the service call 300. The system and method for determining which service person 320 is assigned to the task can be one of a variety of methods, and is not part of the present invention.

Notice that a service call 300 is assigned to a service person 320, is sent to the anticipatory download system 10, serving as a trigger, as shown in step 202 of FIG. 4. The entry of the service call 300 prompts the anticipatory download system 10 to utilize the data collection component 20 to collect information about and from various external systems at step 204. In this arrangement of the present invention, information can be collected from the service call system 310 about the specific failed piece of equipment 302 and the type of failure that resulted in the service call 300 being placed. The data collection component 20 can also search the various databases 100 and any other data sources 140 connected to or communicating with the anticipatory downloading system 10 to find additional data files that may be relevant to the failure and/or failed equipment 302. Other information about the files, such as the file size and type may also be identified. The data collection component 20 can also determine if there are multiple files in different formats containing the same information. For example, there may be a high-resolution video file, a low-resolution video file, and a slide show with audio that are all on the same topic. Data is, also collected about the site where the failed equipment 302 is located/will be repaired, if available, including information about what type(s) of communication access are available at that location.

Additional information may also be collected about the equipment 302, including information about previous repairs and maintenance, failure history, etc. This information may reside in the service call system 310, or may be stored in one or more databases 100, or stored on other data sources 140.

Additionally, in this arrangement of the present invention, data can be collected about the service person 320, such as the type of electronic equipment 120 the service person 320 has, and the types of electronic connectivity available for that equipment 120, his/her current location, that person's training and experience with the failed equipment and failure type, what information that the person 320 may already have on his electronic equipment 120 related to the equipment failure, including what data files, and what version of those files the service person 320 has referenced and utilized in previous repairs.

At step 205, the analysis module 30 will analyze the data collected by the data collection component 20, and if there is more than one possible cause for the equipment failure, the analysis module will use one or more computerized algorithms to evaluate the possible causes of the equipment failure, and based on the data collected, including information about the various types of failures and the history of the specific failed equipment, assign a probability to each of the possible failure causes.

At step 206, the analysis module 30 will use one or more computerized algorithms to assess the relevance of the data identified in step 204 to the equipment failure, and to the likely cause(s) of the failure identified in step 205. At step 207, the analysis module 30 will use one or more computerized algorithms to analyze the information collected about the service person 320 in step 204, such as that person's training and experience with the failed equipment and failure type, what information that the person may already have on his electronic equipment 120 related to the equipment failure, including the version of the data, and information about types of data this service person 320 has utilized in previous repairs.

At step 208, the analysis module 30 will use the information identified and collected in steps 204 through 207 to assign priorities to the various data files that are relevant to the equipment failure and are candidates to be pre-downloaded. Note that, depending on the parameters of the anticipatory download system 10, this may be all the identified files, or the system may have identified only certain files having a high enough relevance to warrant downloading. If any data files have been identified as being potentially relevant, but the latest versions of those files are already downloaded on the service person's processor 120, those files can be eliminated from the list of information that is relevant and may need to be downloaded. The analysis module 30 will rank the various data files based on the calculations performed. The analysis module 30 also collects other information about the various data files, including size, file type, and if appropriate, location (if there are multiple databases).

At step 210 the availability module 40 will analyze the information collected about the service person's current location and the location of the equipment to be repaired, and use one or more computerized algorithms to calculate the anticipated route the service person will take to get to the repair site, and the estimated time to arrive. The system may even take into consideration the fact that the service person has to stop at an intermediate location and pick up parts that will be needed to make the repairs, adding that time into available download time. The system will determine if there are appropriate access methods to the selected data at the repair site, in which places along the service person's route, the various types of access available, when and where they will be available, for how long, and the costs associated with the various connectivity sources, taking into consideration the service person's equipment and download capabilities. The system may even take additional factors into consideration, such as availability of data connectivity at the service person's current location, and the projected time the service person will remain at that location before going to the location where the equipment to be serviced is located. For example, if the service person is currently at a different service call, and it is anticipated that the repair currently being performed by the service person will take a specific time period to complete, but data downloading for that job is complete, the time during which the service person is completing the current repair could be used for downloading information related to the next service call. The availability module 40 will generate information about the various data access types available, where, and the projected duration of each connection.

At step 212 the prioritization module 50 will collect the results obtained in steps 208 and 210 and use one or more computerized algorithms to prioritize what data should be downloaded and when, taking into consideration the various factors and information collected by the analysis and availability modules 30, 40. For example, when prioritizing what files can be downloaded during the available time blocks, the prioritization module 50 will consider if there are different types of a particular file available, such as a low-resolution video, rather than a hi-resolution video. In one arrangement of the present invention, the prioritization module 50 could provide the proposed prioritized data list to the service person, allowing the service person to provide additional input as to data on the list that s/he does not need, files the service person may want that are not currently on the list, or changing the order of importance for download. The prioritization module 50 then evaluates the prioritized data list, and calculates access times and types, estimated download times for various pieces of data at various speeds, and the total download time available.

Figure 5:
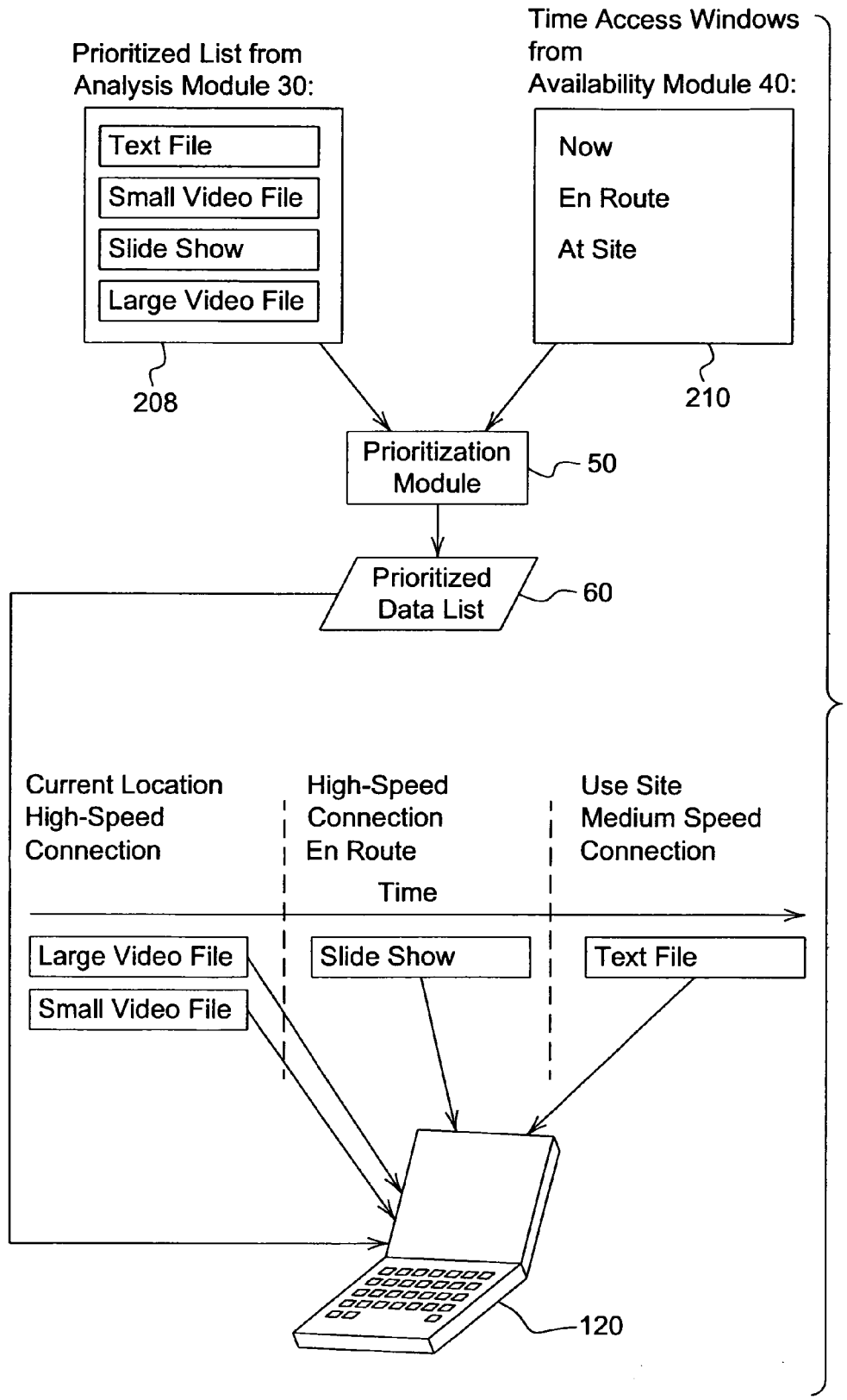
FIG. 5 is a block diagram of a portion of an exemplary system showing data downloading in accordance with the present invention.

For example, as shown in FIG. 5, say the availability module 40 has identified an initial access window that is a relatively large block of time with a high-speed connection, which is at the service person's present location, a second access window on the service person's access route that is also a high-speed connection, but for a shorter block of time, and a third access window, at the actual repair site that is a lower speed connection. The analysis module 30 has identified and ranked 4 pieces of information that should be downloaded before/while the service person 320 arrives at the site where the equipment 302 is located. The data file on the list having the highest priority is a text-only file, the next file is a small video file, the third file is a slide show incorporating text, photographs and short video clips, and the fourth file is a large video file. The prioritization module 50 will evaluate the prioritized list of data files and the availability information, and determine that by rearranging when each file is downloaded, all of the files can be downloaded before they are needed.

At step 214, the prioritization module 50 will generate a prioritized download list based on the calculations performed at step 212. At step 216 the anticipatory download system 10 will send the prioritized list to the service person's processor 120, along with instructions that tells the service person's processor 120 that the large video file and small video file should both be downloaded during the first access window, and when, where and how to make that connection; that the slide show presentation can be downloaded during the second access window; and that the data file, although it was originally ranked as the data file having the highest priority, can be downloaded during the third access window, enabling downloading of all needed information prior to when any of it will be needed. As can be seen in FIG. 5, the large and small video files are downloaded to the service person's processor 120 while the service person 320 is at his/her current location. While the service person is en route, a second high-speed connection is available, and the service person's processor 120 will make the necessary connection and download the slide show when that connection is accessible. Once the service person 320 arrives at the repair site, a low speed connection can be made and the text file downloaded to the service person's processor 120.

After the service person 320 has completed the service call 300, the anticipatory downloading system will, at step 250, evaluate what data the service person 320 actually used while performing the repair, the order in which it was used, and if additional information was needed that had not been anticipated to be needed by the system. The anticipatory downloading system 10 will use this information to assist it in future relevance rankings and prioritization. The capability of the anticipatory downloading system 10 for machine learning will help the system more accurately identify and assess data files and determine what files to download in future situations, how long downloads actually take, likely causes of equipment failure, and what information is more likely to be used by a service person in a particular situation as the base of knowledge and experience grows with time.

Also, it can be appreciated that the system 10 of the present invention can be used in situations other than that described in the above example. For example, if personnel at a construction/repair facility use electronic devices to access information about parts, but the facility does not have a secure high-speed connection enabling constant access to the database of information the present invention would be useful. Additionally, if the devices used do not have a large amount of storage associated with them, the range of data that might be needed cannot be kept in device memory. If it can be anticipated that specific information will be needed/be likely to be needed for a particular project, the system 10 of the present invention could be used to anticipate information that will be needed, and prioritize and download the information when connections are available.

It is understood that the present invention can take many forms and embodiments. Accordingly, several variations may be made in the foregoing without departing from the spirit or the scope of the invention. Having described the preferred embodiment, it will become apparent that various modifications can be made without departing from the scope of the invention as defined in the accompanying claims.

I claim:

1. A computer implemented method for managing access to data stored in at least one centralized location, the method comprising:
 a) identifying at least one data file that is needed at a destination location by an end user having a processor;
 b) determining i) a route from a current location of the end user to the destination location with an intermediate stopping location between the current location and the destination location,
  ii) a projected time the end user will remain at the current location and the intermediate stopping location before going to the destination location, and
  iii) various types of data connections available at the current location and the intermediate stopping location along the route;
 c) identifying an available data connection access time to the various data connections that will be available for use by the end user's processor at the current location and the intermediate stopping location based on the determined projected time at the current location and the intermediate stopping location;
 d) calculating which data files can be downloaded at the current location and which data files can be downloaded at the intermediate location using an anticipated download time for each relevant data file and the available data connection access time for the current location and the intermediate location;
 e) using the calculations made in step d to assign a priority to each identified data file; and
 f) generating a set of prioritized data download instructions for use by the end user's processor for downloading the relevant data files while at the current location and when at the intermediate stopping location.

2. The computer implemented method of claim 1 further comprising the end user's processor using the prioritized data download instructions to download the prioritized data files to the end user's processor.

3. The computer implemented method of claim 1 wherein assigning a priority to each identified data file further comprises collecting information about the end user, and assigning the priority to each data file, based at least in part, on the information collected about the end user.

4. The computer implemented method of claim 3 wherein the information collected about the end user includes at least information about the end user's previous usage of data files.

5. The computer implemented method of claim 3 wherein the information collected about the end user includes information about data files currently available on the end user's processor.

6. The computer implemented method of claim 1 further comprising identifying the connection speed of each data connection.

7. The computer implemented method of claim 1 further comprising determining the estimated cost for using each identified data connection available, and using this information in performing steps d and e.

8. The computer implemented method of claim 7 further comprising determining if one or more data files to be downloaded can be downloaded using a less expensive connection.

9. The computer implemented method of claim 1 further comprising identifying data connections available at the destination location where the end user will need the at least one data file.

10. A system, having a processor, for managing access to data files stored in a centralized location, the system comprising:
- an availability module that determines if an end user will be traveling from a current location to a destination location where the end user will need at least one data file, projects the end user's route, identifies various types of data connections available at a plurality of en route stopping locations, and estimates a time each connection will be available based on a time the user will remain at each en route stopping location; and
- a prioritization module that utilizes the results from the availability module to generate a prioritized list of data files to download from the centralized database to a processor at each en route location where a data connection is available wherein the prioritized list is based on the estimated time the identified data connections available at the en route locations will be available.

11. The system of claim 10 further comprising generated instructions for when and how to download each data file on the prioritized list.

12. The system of claim 10 wherein the destination location is a position of equipment to be repaired.

13. A computer implemented method for managing access to data stored in at least one centralized location, the method comprising:
- determining that an end user will be traveling from a current location to a second location where the end user will need at least one data file;
- projecting the end user's route including at least one en route stopping location;
- identifying a separate data connection available at the current location and each of the at least one projected en route stopping locations;
- estimating a time each connection will be available based on an estimated time the end user will remain at each location; and
- generating a prioritized list of data files to download from the centralized database to a processor at each en route stopping location where a data connection is available wherein the prioritized list is based on the estimated time the identified data connections available at the en route locations will be available.

\* \* \* \* \*